United States Patent
Bechmann

(10) Patent No.: US 12,345,331 B2
(45) Date of Patent: Jul. 1, 2025

(54) BRAKING DEVICE HAVING AN ACTUATABLE MEMBER, AND A METHOD FOR OPERATING A BRAKING DEVICE

(71) Applicant: ZF Active Safety GmbH, Koblenz (DE)

(72) Inventor: Roman Bechmann, Koblenz (DE)

(73) Assignee: ZF Active Safety GmbH, Koblenz (DE)

( * ) Notice: Subject to any disclaimer, the term of this patent is extended or adjusted under 35 U.S.C. 154(b) by 0 days.

(21) Appl. No.: 18/535,333

(22) Filed: Dec. 11, 2023

(65) Prior Publication Data

US 2024/0209941 A1   Jun. 27, 2024

(30) Foreign Application Priority Data

Dec. 21, 2022   (DE) .......................... 102022134387.1

(51) Int. Cl.
*F16H 63/34*   (2006.01)

(52) U.S. Cl.
CPC ................ *F16H 63/3475* (2013.01)

(58) Field of Classification Search
CPC .. B60T 13/741; B60T 13/746; F16H 63/3475; F16D 2121/20; F16D 63/002
See application file for complete search history.

(56) References Cited

U.S. PATENT DOCUMENTS

| | | | |
|---|---|---|---|
| 6,412,613 B1 * | 7/2002 | Lu .......................... | B60T 13/741 188/161 |
| 2020/0377200 A1 * | 12/2020 | Goyez ................... | F16D 63/002 |
| 2022/0055596 A1 * | 2/2022 | Kaufmann ............ | B60T 13/748 |

FOREIGN PATENT DOCUMENTS

| | | |
|---|---|---|
| DE | 102010000737 A1 | 8/2010 |
| WO | 2020114822 A1 | 6/2020 |

* cited by examiner

*Primary Examiner* — Lori Wu
(74) *Attorney, Agent, or Firm* — Kristin L. Murphy

(57) ABSTRACT

The disclosure relates to a braking device having an actuatable member, an electromagnetic coil having at least two coil windings, which can be energized independently of one another and which are each designed to generate a magnetic force for the actuatable member in an actuating direction in an energized state, and a resetting element, which exerts a force on the actuatable member in a resetting direction opposite to the actuating direction. The at least two coil windings and the resetting element are designed in such a way that the magnitude of the total magnetic force of all the coil windings exceeds the magnitude of the force of the resetting element only when all the coil windings are energized simultaneously. The disclosure further relates to a method for operating a braking device.

15 Claims, 4 Drawing Sheets

BRAKING DEVICE HAVING AN ACTUATABLE MEMBER, AND A METHOD FOR OPERATING A BRAKING DEVICE

CROSS-REFERENCE TO RELATED APPLICATION

This application claims priority to German Priority Application No. 102022134387.1, filed Dec. 21, 2022, the disclosure of which is incorporated herein by reference in its entirety.

TECHNICAL FIELD

The disclosure relates to a braking device having an actuatable member, and to a method for operating a braking device.

BACKGROUND

Braking devices having electromechanical vehicle brakes typically comprise an electric motor, a transmission, and a spindle drive. If a braking effect is to be produced, the spindle drive is actuated in such a way by the electric motor, via the transmission, that a clamping force is applied to the brake disc of the vehicle brake by the brake linings.

If the electromechanical vehicle brake is to be used as a parking brake, it is essential that a clamping force and thus a braking effect are also maintained.

To achieve this, the prior art discloses solutions in which actuation of the electromechanical vehicle brake is prevented by a pawl and a gear wheel coupled to the transmission or the motor as soon as the desired clamping force for producing the parking brake function is reached. The rotation of the transmission or electric motor of the vehicle brake is thus blocked, and therefore it can no longer be released.

During driving, the pawl is not engaged and is usually held in an initial position by a resetting element, for example a spring. In the initial position, the electromechanical brake can be actuated freely.

If the actuation of the electromechanical brake is to be blocked, the pawl is actuated by way of a coil. During this process, the coil is energized and exerts a force on the pawl towards the gear wheel which exceeds that of the resetting element. The pawl moves towards the gear wheel and, in the engaged position, engages in the toothing.

Actuation of the brake can only take place again when the energization of the coil is cancelled, with the result that the pawl is moved back into the initial position by the resetting element.

The disadvantage here is that, if the pawl is incorrectly actuated, it blocks the actuation of the electromechanical brake. This may be the case, for example, when the coil is energized on account of a faulty controller or defective switch.

This has the effect that actuation of the brake is no longer possible. Thus, for example, there may be a continuous braking force acting on one or more of the vehicle wheels. Conversely, it is also possible for an electromechanical brake to be blocked in a position in which the brake linings do not exert a clamping force on the brake disc. In this case, the electromechanical brake would not be able to apply any braking force, even in the event of a braking request.

A safety mechanism for detecting the unwanted blocking of the actuation of the brake can be formed by a position detection system that detects the position of the pawl or that of the movable coil mechanism. However, only detection of the malfunction is achieved by this arrangement, while the malfunction is not prevented.

Against this background, what is needed is to provide a braking device having a pawl which prevents unintentional blocking of the actuation of the brake.

SUMMARY

A braking device is disclosed having an actuatable member, an electromagnetic coil having at least two coil windings, which can be energized independently of one another and which are each designed to generate a magnetic force for the actuatable member in an actuating direction in the energized state, and a resetting element, which exerts a force on the actuatable member in a resetting direction opposite to the actuating direction, wherein the at least two coil windings and the resetting element are designed in such a way that the magnitude of the total magnetic force of all the coil windings exceeds the magnitude of the force of the resetting element only when all the coil windings are energized simultaneously.

The basic concept of the disclosure is to provide the force which is necessary to move the actuatable member in the actuating direction by a plurality of coil windings which can be energized independently of one another. This ensures that actuation of the actuatable member takes place when all the coil windings are energized at the same time.

If individual coil windings are incorrectly energized, this admittedly results in a force on the actuatable member in the actuating direction. However, since the counterforce applied by the resetting element is greater, no actuation of the actuatable member takes place. Consequently, the braking device can be actuated despite (an) incorrectly triggered coil winding or windings and is not blocked by the member.

The risk of all the coil windings being incorrectly energized at the same time is extremely low, and therefore unwanted actuation of the member and associated blocking of the actuation of the braking device can be ruled out.

According to one aspect of the disclosure, the at least two coil windings and the resetting element are designed in such a way that the magnitude of the total magnetic force of all the coil windings falls below the magnitude of the force of the resetting element if only one of the coil windings is not energized.

Consequently, in accordance with the above explanations, actuation of the member in the actuating direction does not take place if not all the coil windings are energized. Incorrect energization of individual coil windings does not result in blocking of the actuation of the braking device.

In one exemplary arrangement, the magnetic force, acting on the actuatable member, of each coil winding can be at least approximately the same in the energized state.

This simplifies the design of the electromagnetic coil, since all the independently energizable coil windings are of identical design.

Each coil winding is advantageously assigned a dedicated switching device, wherein the coil windings can be energized independently by the respective switching device, and the switching devices are controlled by a controller.

If one of the switching devices is faulty and allows energization, it affects only a single coil winding and not all of them. Thus, each switching device must be activated individually, e.g. by a controller, which may include further subcontrollers.

Furthermore, each coil winding can be assigned a dedicated measuring resistor.

This makes it possible to detect whether an individual coil winding is unintentionally energized, and allows timely replacement of the defective components that are causing the unwanted energization of the coil winding.

Furthermore, the resetting element can be an elastic spring element. These are typically extremely advantageous and the resetting force of the spring element can be set easily through the selection of the spring element and its integration with the member.

A method for operating a braking device is also disclosed, the method having an actuatable member and an electromagnetic coil with at least two coil windings, which can be energized independently of one another, comprising the following steps:
a) energizing each of the coil windings and generating a magnetic force acting on the actuatable member in an actuating direction;
b) moving the member from an initial state to an actuated state;
c) keeping the member in the actuated state with continued energization of each of the coil windings; and
d) cancelling the energization of at least one coil winding and resetting the member to the initial state.

As regards the resulting advantages, attention is drawn to the explanations above.

As a preferred option, it is possible that, in steps a) to d), a force applied by a resetting element acts on the member towards the initial state, wherein the magnitude of the total magnetic force of all the coil windings exceeds the magnitude of the force of the resetting element if all the coil windings are energized simultaneously.

Conversely, energization of individual coil windings or of all the coil windings except one is not sufficient to exceed the magnitude of the force of the resetting element.

As regards the resulting additional advantages, attention is likewise drawn to the explanations above.

Furthermore, each coil winding can be assigned a dedicated switching device, which is controlled by a controller, wherein, in step a), the controller activates all the switching devices in order to energize each coil winding.

Thus, according to the previous explanations, all the switching devices must be activated, such that all the coil windings are energized and, in accordance with step b), the member moves from the initial state to the actuated state, blocking actuation of the braking device. As regards the resulting further advantages, attention is likewise drawn to the explanations above.

BRIEF DESCRIPTION OF DRAWINGS

The disclosure is described below with reference to an exemplary arrangement which is illustrated in the attached drawings. In the drawings.

DETAILED DESCRIPTION

Figure 1:
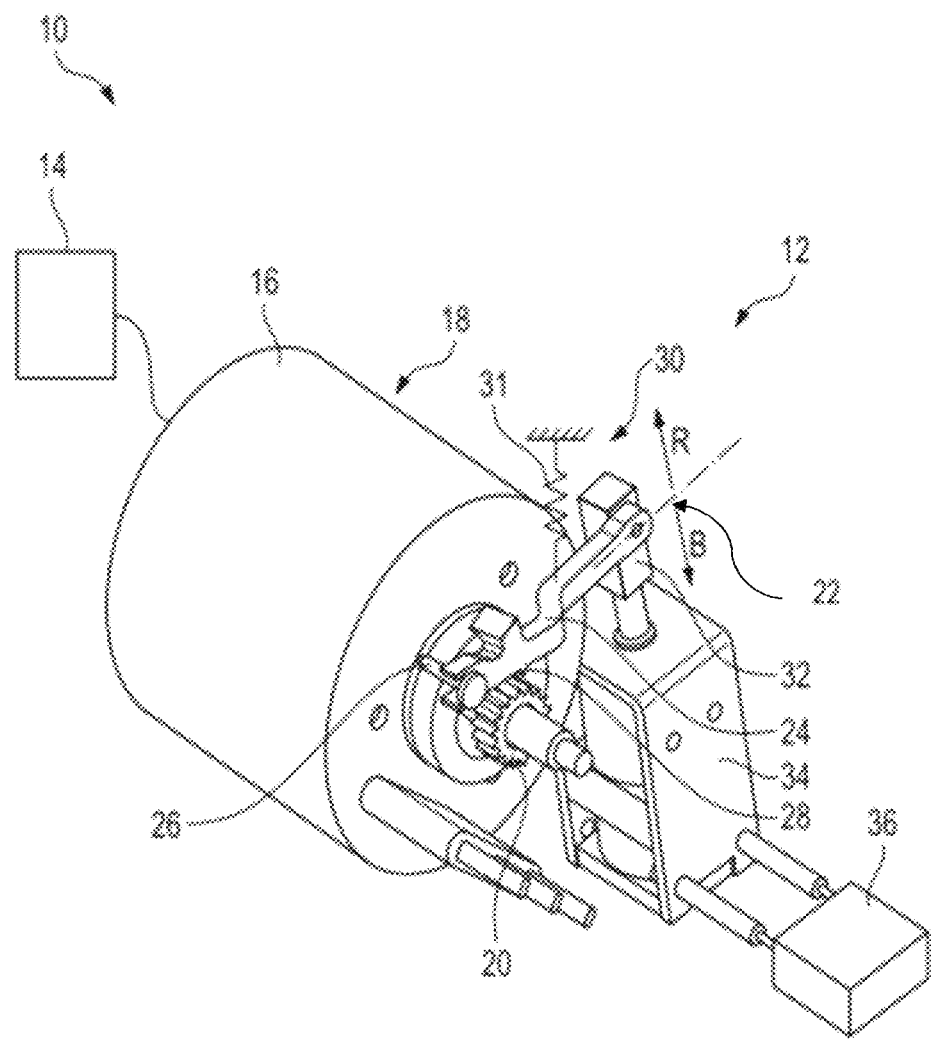
FIG. 1 shows a schematic drawing of a braking device according to the disclosure in a perspective illustration.

FIG. 1 shows a braking device 10 in the form of an actuator 12 for a vehicle brake 14.

The vehicle brake 14 is a parking brake or has at least a parking brake function.

The braking device 10 comprises a housing 16, in which an electromechanical drive 18 having an electric motor and a transmission is accommodated. The electromechanical drive 18 serves to produce a clamping force, by which brake linings are urged towards a brake disc, giving rise to a braking effect.

Furthermore, on the end of the housing 16, the braking device 10 has a gear wheel 20, which is mechanically coupled to the drive 18.

In addition, an actuatable member 22 in the form of a pawl 24 is provided on the housing 16.

At its one end, the actuatable member 22 is pivotably mounted on a pin 26 and has a locking tooth 28, which is designed to engage in the toothing of the gear wheel 20.

This would have the effect that the actuation of the braking device 10 by the drive 18 is no longer possible since the gear wheel 20 and thus also the entire drive 18 itself is fixed against rotation by the locking tooth 28 of the pawl 24.

Associated with this, the last-selected position of the braking device 10 is correspondingly maintained.

In addition, the actuatable member 22 is coupled to a resetting element 30, which exerts a force on the actuatable member 22 in a resetting direction R.

The resetting element 30 can be an elastic spring element 31.

At the end opposite the pin 26, the actuatable member 22 is furthermore coupled to an armature rod 32 of an electromagnetic coil 34.

Via the armature rod 32, the coil 34 can exert a force counter to the resetting direction R in an actuating direction B.

The electromagnetic coil 34 is coupled to and controlled by an electric control system 36.

The structure of the electromagnetic coil 34 and that of the electric control system 36 will be explained below with reference to FIGS. 2 and 3.

The electromagnetic coil 34 comprises a first coil winding 38 and a second coil winding 40. The coil windings 38, 40 can be energized independently of one another and, in the energized state, exert a magnetic force on the armature rod 32 and thus also on the actuatable member 22 coupled to the armature rod 32 in the actuating direction B.

In this case, the two coil windings 38, 40 are designed in such a way that the magnetic force, acting on the actuatable member 22, of each coil winding 38, 40 is at least approximately the same in the energized state.

Furthermore, the two coil windings 38, 40 and the resetting element 30 are matched to one another in such a way that the magnetic force in the actuating direction B when only one of the coil windings is energized falls below the force of the resetting element 30 in the resetting direction R, and the magnetic force when both coil windings 38, 40 are energized simultaneously exceeds the force of the resetting element 30 in the resetting direction R on the actuatable member 22.

In this case, the control and energization of the coil windings 38, 40, which can be energized independently of one another, are performed by the electric control system 36. For the supply of electric energy, an electric voltage source 42 is provided, which can be electrically coupled to the first coil winding 38 via a first switching device 44 and to the second coil winding 40 via a second switching device 46.

The switching devices 44, 46, and thus also the coil windings 38, 40, are controlled by a common controller 48.

In addition, the first coil winding 38 is assigned a first measuring resistor 50, and the second coil winding 40 is assigned a second measuring resistor 52, by which the controller 48 can check whether the coil windings 38, 40 are energized.

Figure 3:
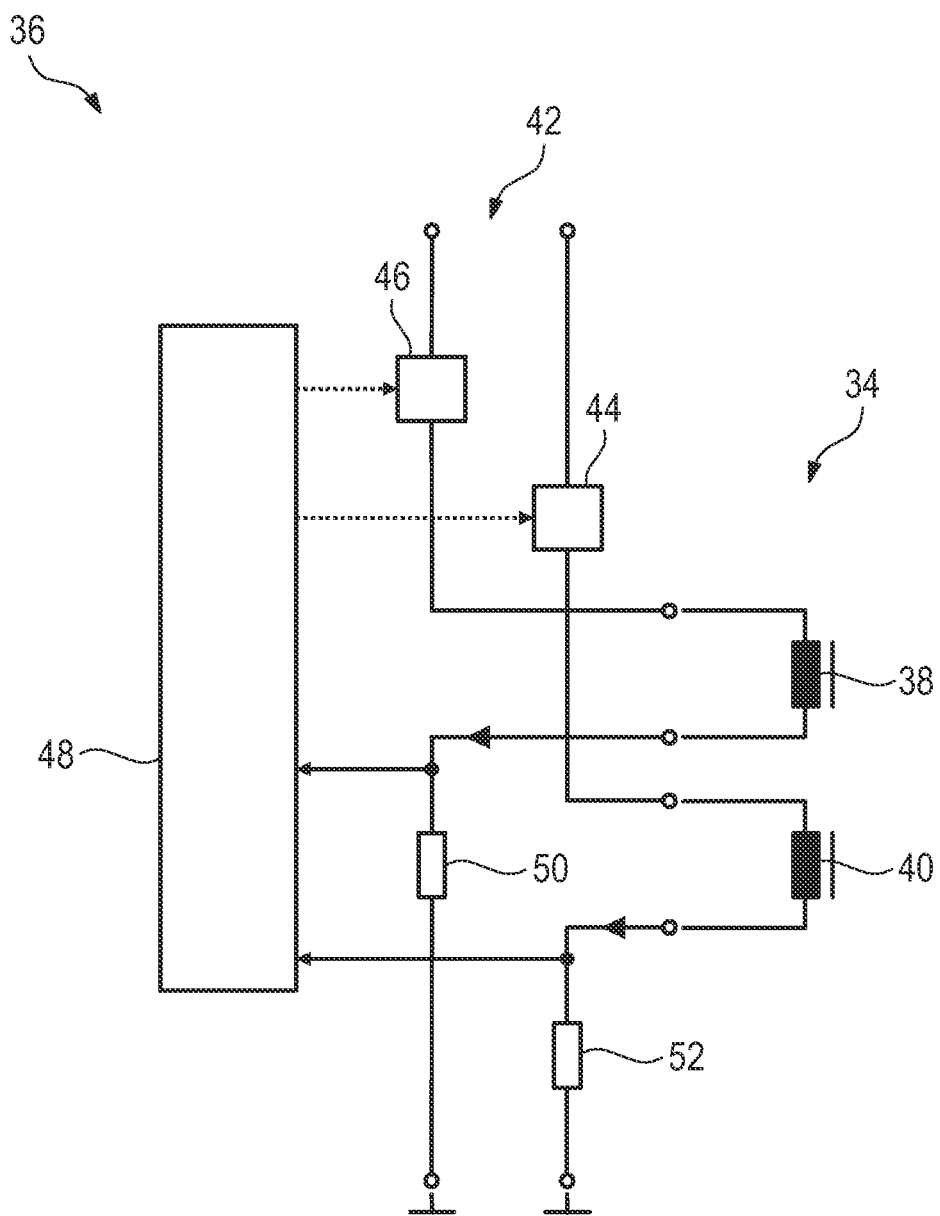
FIG. 3 shows a circuit diagram of the electromagnetic coil with the electric control system of FIG. 2.

This is accomplished by the controller detecting the voltage drops across the respective measuring resistor 50, 52 and thereby being able to infer the coil currents in the coil windings 38, 40 (see, for example, FIG. 3).

Figure 4:
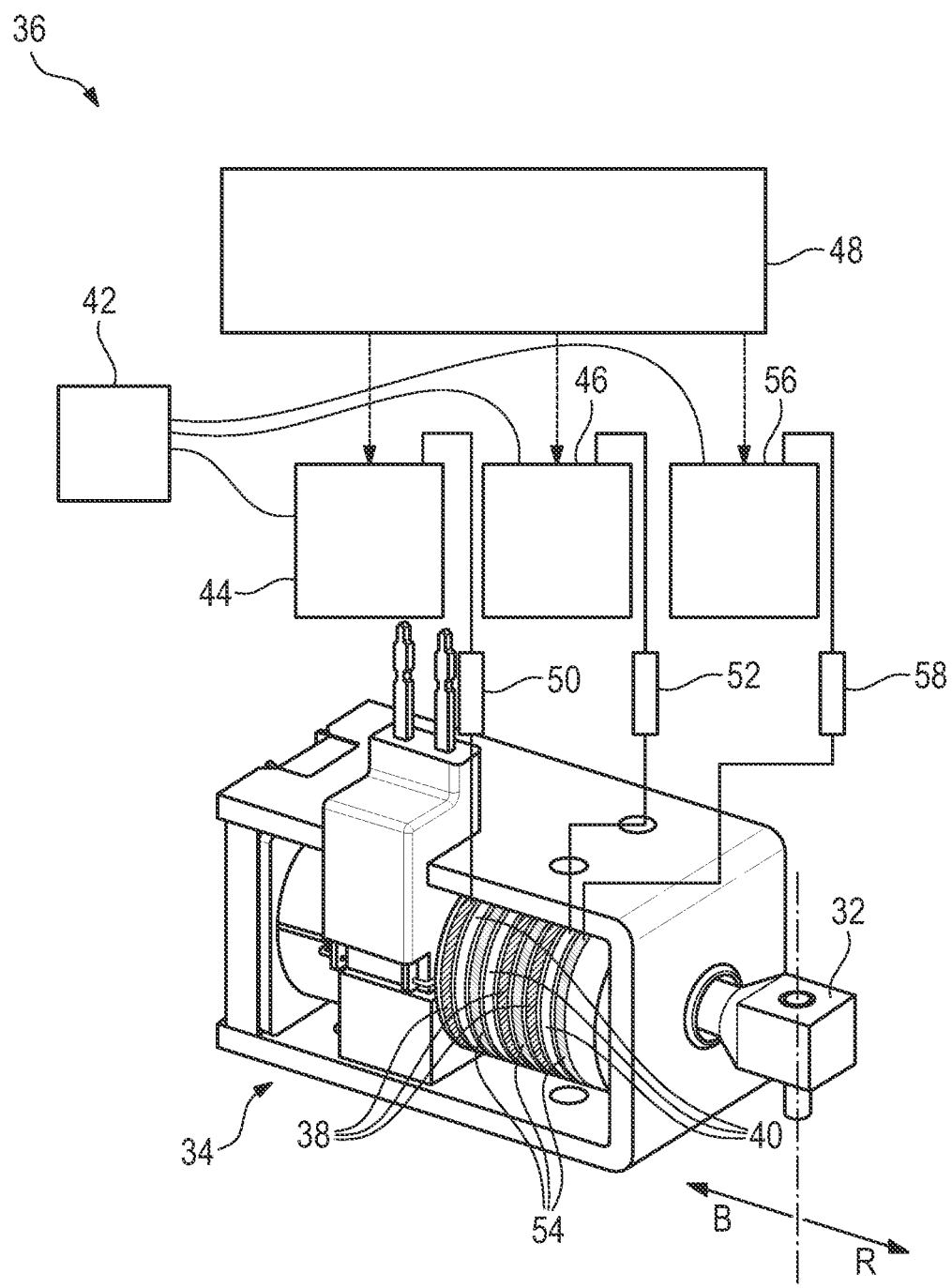
FIG. 4 shows the electromagnetic coil of a braking device according to the disclosure with the electric control system according to a first alternative.

FIG. 4 shows the electromagnetic coil 34 with the electric control system 36 according to a first alternative arrangement.

Figure 2:
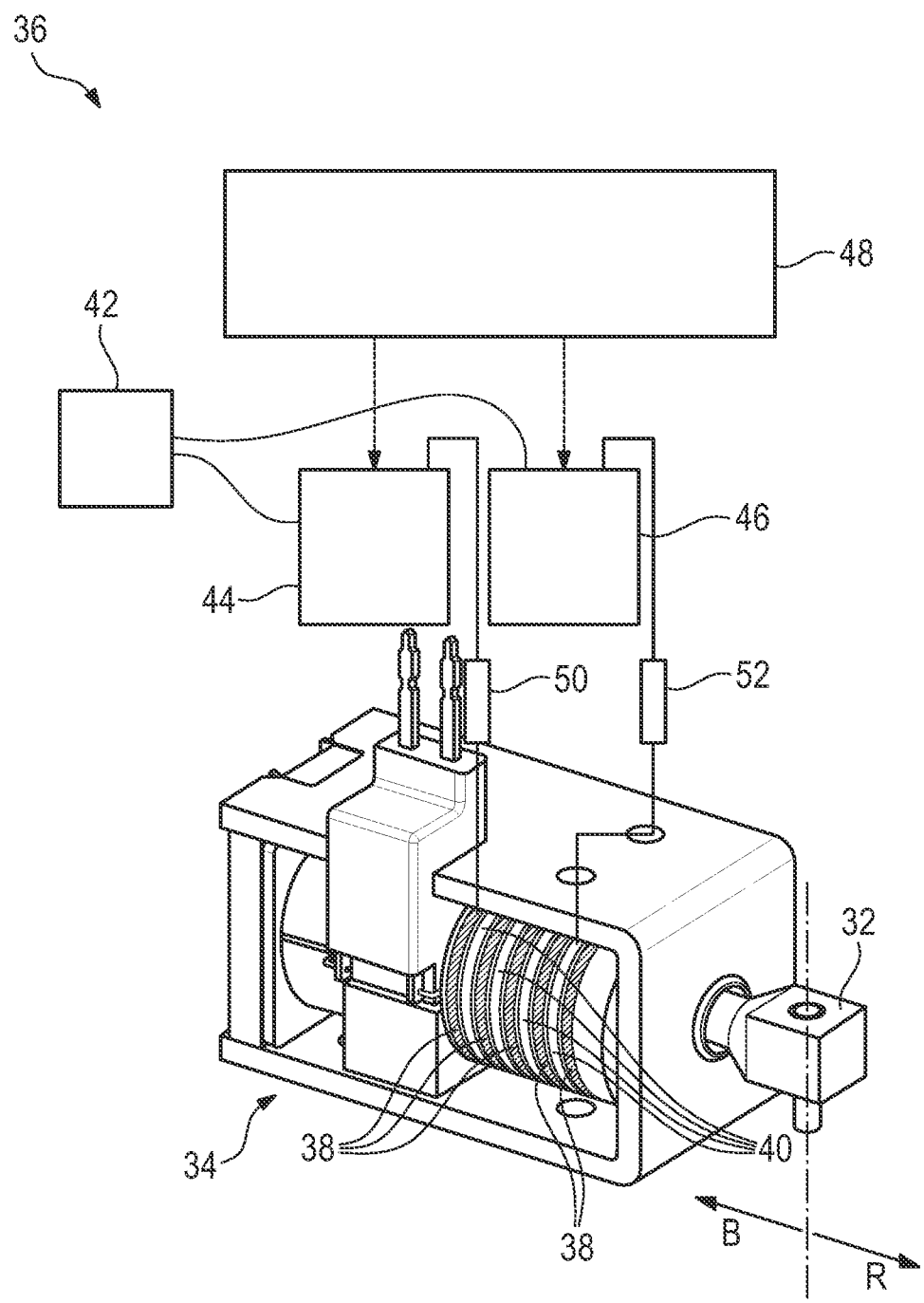
FIG. 2 shows a schematic drawing of an electromagnetic coil of a braking device according to the disclosure with an electric control system in a perspective illustration.

According to the first alternative arrangement, in contrast to the coil 34 shown in FIGS. 2 and 3, a third coil winding 54 is provided, which can likewise be energized independently of the other coil windings 38, 40.

Like the other two coil windings 38, 40, this third coil winding 54 is designed to exert a magnetic force on the actuatable member 22 in the actuating direction B and is coupled to the electric voltage source 42 via a third switching device 56 for energization.

In accordance with the above explanation, the third switching device 56 assigned to the third coil winding 54 and also a third measuring resistor 58 are coupled to the controller 48.

Furthermore, the three coil windings 38, 40, 54 are designed in such a way that the magnetic force acting on the actuatable member 22 falls below the force of the resetting element in the resetting direction R as soon as only two of the three coil windings 38, 40, 54 are energized, and exceeds it if all the three coil windings 38, 40, 54 are energized simultaneously.

The operation of the braking device 10 and the locking and unlocking of the vehicle brake 14 will be explained below. The operation of the braking device 10 is carried out in an analogous manner for both of the alternatives explained above.

For this purpose, the actuatable member 22 is initially in an initial state (see FIG. 1). In this case, only the force of the resetting element is acting on the actuatable member 22 in the resetting direction R.

In the first step, each of the coil windings 38, 40 or 38, 40, 52 is first energized by the controller 48 activating the switching devices 44, 46 or 44, 46, 56, such that all the coil windings 38, 40 or 38, 40, 52 are electrically coupled to the voltage source 42.

This has the effect that a magnetic force acts on the armature rod 32, which is directed in the actuating direction B, counter to the resetting direction R, and exceeds the force of the resetting element 30 in terms of magnitude.

As a result, the actuatable member 22 moves from the initial state into an actuated state. In the process, the actuatable member 22 is pivoted about the pin 26 and moved towards the gear wheel 20, with the result that the locking tooth 28 engages in the toothing of the gear wheel 20.

The actuation of the braking device 10 is blocked, and therefore the clamping force set by the drive 18 and acting on the vehicle brake 14 is maintained and release of the vehicle brake 14 is not possible.

The actuatable member 22 remains in the actuated state as long as each of the coil windings 38, 40 or 38, 40, 52 is energized.

If the energization of all the coil windings 38, 40 or 38, 40, 52 or even only the energization of an individual coil winding is cancelled, the magnitude of the magnetic force in the actuating direction B decreases in such a way that it falls below the magnitude of the force exerted on the actuatable member 22 by the resetting element 30.

The actuatable member 22 pivots back from the actuated state to the initial state.

Actuation of the braking device 10 is enabled, thus allowing the clamping force applied to the vehicle brake 14 once again to be adapted by the drive 18.

This mode of operation ensures that if one or two of the coil windings were to be unintentionally energized on account of a fault, the actuation of the braking device 10 is not blocked in an unwanted manner.

In addition, incorrect energization of the coil windings 38, 40 could be detected by the controller 48 via the measuring resistors 50, 52 or 50, 52, 58.

The invention claimed is:

1. A braking device comprising: an actuatable member, an electromagnetic coil having at least two coil windings, which can be energized independently of one another and which are each designed to generate a magnetic force for the actuatable member in an actuating direction in the energized state, and a resetting element, which exerts a force on the actuatable member in a resetting direction opposite to the actuating direction, wherein the at least two coil windings and the resetting element are designed in such a way that the magnitude of a total magnetic force of all the coil windings exceeds the magnitude of the force of the resetting element only when all the coil windings are energized simultaneously and wherein the at least two coil windings and the resetting element are designed in such a way that a magnitude of the total magnetic force of all the coil windings falls below the magnitude of the force of the resetting element if only one of the coil windings is not energized.

2. A braking device according to claim 1, wherein the magnetic force, acting on the actuatable member, of each coil winding is the same in the energized state.

3. A braking device according to claim 2, wherein each coil winding is assigned a dedicated switching device, wherein the coil windings can be energized independently by the respective switching device, and the switching devices are controlled by a controller.

4. A braking device according to claim 3, wherein each coil winding is assigned a dedicated measuring resistor.

5. A braking device according to claim 4, wherein the resetting element is an elastic spring element.

6. A braking device according to claim 3, wherein the braking device is an actuator, and the actuatable member is coupled to a pawl, which is used to lock a vehicle brake.

7. A braking device according to claim 1, wherein each coil winding is assigned a dedicated switching device, wherein the coil windings can be energized independently by the respective switching device, and the switching devices are controlled by a controller.

8. A braking device according to claim 1, wherein, each coil winding is assigned a dedicated measuring resistor.

9. A braking device according to claim 1, wherein, the resetting element is an elastic spring element.

10. A braking device according to claim 1, wherein the braking device is an actuator, and the actuatable member is coupled to a pawl, which is used to lock a vehicle brake.

11. A braking device according to claim 10, wherein the vehicle brake is a vehicle parking brake.

12. A method for operating a braking device having an actuatable member and an electromagnetic coil with at least two coil windings, which can be energized independently of one another, comprising the following steps:

a) energizing each of the coil windings and generating a magnetic force acting on the actuatable member in an actuating direction;
b) moving the actuatable member from an initial state to an actuated state;
c) keeping the actuatable member in the actuated state with continued energization of each of the coil windings; and
d) cancelling the energization of at least one coil winding and resetting the member to the initial state.

13. The method according to claim 12, wherein, in steps a) to d), a force applied by a resetting element acts on the member towards the initial state, wherein a magnitude of a total magnetic force of all the coil windings exceeds a magnitude of the force of the resetting element if all the coil windings are energized simultaneously.

14. The method according to claim 13, wherein each coil winding is assigned a dedicated switching device, which is controlled by a controller, and, in step a), the controller activates all the switching devices in order to energize each coil winding.

15. The method according to claim 12 wherein each coil winding is assigned a dedicated switching device, which is controlled by a controller, and, in step a), the controller activates all the switching devices in order to energize each coil winding.

* * * * *